Feb. 9, 1937. C. N. MITCHELL 2,070,409
HYDRAULIC SHOCK ABSORBER
Filed June 8, 1935 2 Sheets-Sheet 1
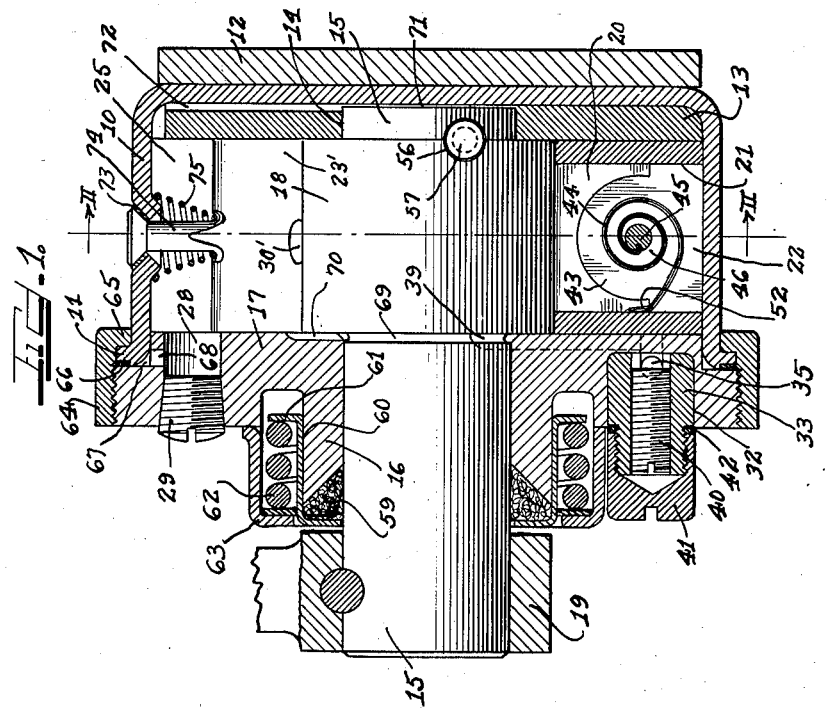
Inventor
Courtney N. Mitchell.
by Charles O'Niell Attys.

Feb. 9, 1937.   C. N. MITCHELL   2,070,409
HYDRAULIC SHOCK ABSORBER
Filed June 8, 1935   2 Sheets-Sheet 2
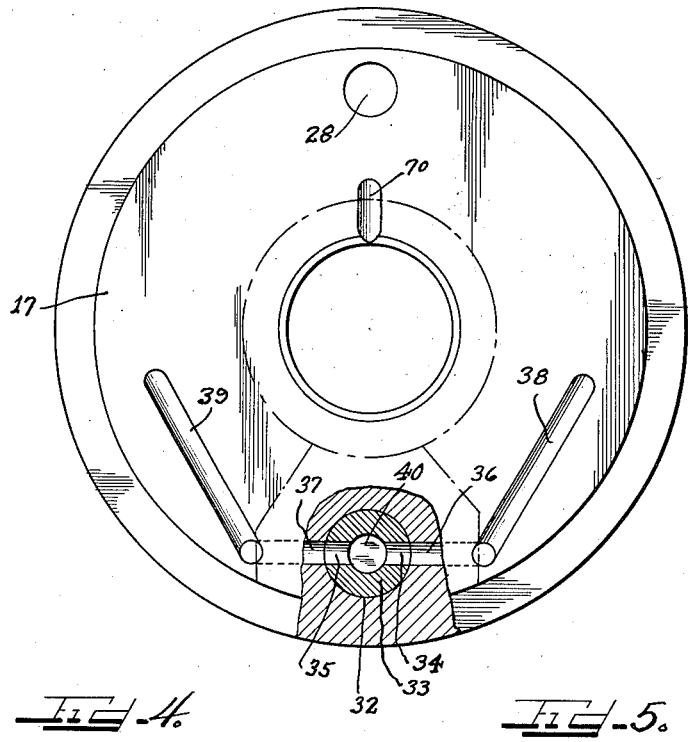
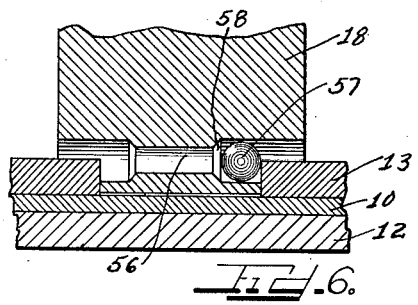
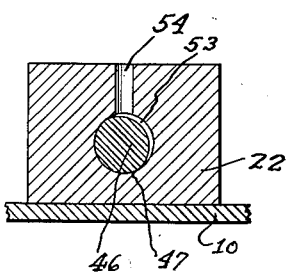
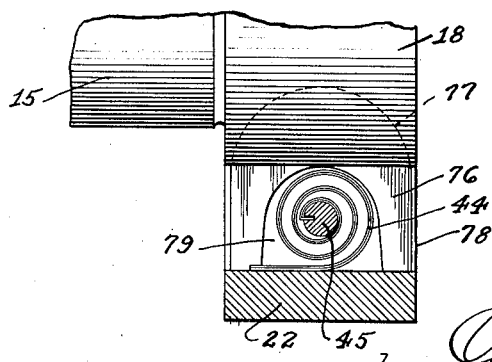
Inventor
Courtney N. Mitchell.
by Charles O. Hills Attys.

Patented Feb. 9, 1937

2,070,409

UNITED STATES PATENT OFFICE 2,070,409

HYDRAULIC SHOCK ABSORBER

Courtney N. Mitchell, Strongsville, Ohio, assignor to Houde Engineering Corporation, Buffalo, N. Y., a corporation of New York Application June 8, 1935, Serial No. 25,529

9 Claims. (Cl. 188—89)

My invention relates to hydraulic shock absorbers for checking the movement between two relatively movable members as, for example, the axle and body of an automotive vehicle.

My invention is particularly useful in connection with the type of shock absorber disclosed in my patent No. 1,923,038 issued August 15, 1933. The important object of the invention is to provide improved details of construction, arrangement and operation which will simplify and decrease the cost of manufacture and assembly and increase the efficiency of operation.

The various features of my invention are incorporated in the structure disclosed on the drawings, in which drawings Figure 1 is a vertical diametral section of the shock absorber;

Figure 2 is a section on plane II—II of Figure 1;

Figure 3 is an inside view of the cover structure with parts broken away to disclose a certain valving operation;

Figure 4 is a section on plane IV—IV of Figure 2;

Figure 5 is a section on plane V—V of Figure 2; and

Figure 6 shows a modified arrangement for keying a piston structure to the shaft.

The housing for the shock absorber shown comprises the cup shaped casing 10 preferably in the form of a metal stamping and which has the overhanging peripheral flange 11. Secured against the outer side of the bottom of the casing is a strengthening and mounting plate 12 by means of which the shock absorber may be secured in any suitable manner to a support such as the chassis frame of an automotive vehicle, the plate being preferably welded to the casing.

Within the casing and seated against the bottom thereof is a bearing ring or annular plate 13 having the centrally disposed opening 14 for receiving and journalling at its inner end the shaft 15. The outer end of the shaft is journalled in the bearing flange 16 of the cover structure 17 secured to the periphery of the casing. Extending between and bearing against the inner faces of the ring 13 and cover structure 17 is the cylindrical hub portion 18 of the shaft. To the other end of the shaft a lever 19 is secured for connection, as for example, with the axle of an automotive vehicle.

As shown in Figures 1 and 2, the shaft hub has a radially extending key or wing 20 integral therewith, this wing being of rectangular cross section and extending into the rectangular passage 21 broached through the piston structure 22 which extends across the annular space between the hub and the inner wall of the casing 10 and bears at its outer end against the casing wall. Extending across the annular space between the shaft hub and the casing are the abutments or partition structures 23 and 23', the inner surfaces of these structures forming a bearing for the hub and the outer surfaces of the structures engaging the casing wall and being held against movement by keys 24 and 24' respectively which keys are preferably formed by inward deflection of the casing wall. In axial direction the piston structure and the partition structures extend between the bearing plate 13 and the coverstructure 17, the space 25 between the partition structure providing a reservoir for the hydraulic liquid and the spaces 26 and 27 between the piston structure and the partition structures providing respectively a high pressure hydraulic working chamber and a low pressure working chamber.

The hydraulic fluid is poured into the structure through the filler opening 28 normally closed by a plug 29 and the flow of fluid from the reservoir for replenishing the working chambers is through the ports 30 and 30' under control of check valves 31 and 31' respectively.

Manually adjustable valve structure is provided for controlling the fluid flow between the working chambers. A cylindrical pocket 32 extends into the cover structure 17 from the outer side thereof into which a cylindrical tubular plug 33 is extended and frictionally held. At its inner end the plug is notched longitudinally to provide the diametrally opposite ports or passages 34 and 35. In registration with these port passages 34 and 35 are the passages 36 and 37 which are entirely within the cover structure but deflect axially at their outer end for communication with the channels or grooves 38 and 39 formed in the inner face of the cover structure for exposure to the high pressure and low pressure working chambers 26 and 27 respectively.

Threading into the tubular part 33 is a valve member which may be in the form of a screw 40 whose inner cylindrical end extends between the port passages 34 and 35 for overlap or closure of these ports at their inner ends to a degree determined by the resistance to fluid flow desired. The outer end of the plug 33 is threaded to receive a closure cap 41, a sealing gasket 42 being preferably interposed to prevent the entrance of dirt, moisture or other foreign matter into the valve chamber, and preferably the threads on the valve are leaded before the valve is inserted so that the valve will have seal fit but at the same time may be readily adjusted manually.

On Figure 3, the dot and dash lines indicate the normal or neutral position of the shaft and piston structure, this being also the position shown in Figure 2. When the piston structure is moved in counter-clockwise direction, the hydraulic fluid will flow from the high pressure working chamber 26 to the channel 39 and through the passage 37 and valving port 35 and past the valve 40 and then through passages 34 and 36 to the channel 38 and to the low pressure working chamber 27. When the piston structure is moved in the opposite direction, the fluid flow will be from the low pressure chamber through the same path into the high pressure chamber, the setting of the valve 40 relative to the port passages 34 and 35 determining the resistance to such fluid flow.

In order that the proper shock absorbing resistance of the shock absorber structure may not be interfered with and disturbed by variation in viscosity of the hydraulic fluid due to changes of temperature, I provide a compensating path for flow of fluid between the working chambers, such flow path being preferably thermostatically controlled. As shown in Figures 1 and 2, the piston structure driving wing or key 20 is cut away at its outer end to provide a semi-cylindrical recess 43 which with the outer part of the key receiving passage 21 in the piston structure provides a chamber for a thermostat element which may be in the form of a spiral coil 44 of bi-metal. Extending across the space 21 is the stem 45 of the cylindrical valve 46, this valve being seated in the cylindrical bore 47 in one side of the piston structure and the stem being journalled in the bore 48 in the opposite side of the piston structure. The valve structure is freely rotatable but held against axial displacement by a plug 49 in the end of the bore 48 and by a removable threaded plug 50 in the other end of the bore 47. The inner end of the thermostat coil is secured to the stem by extending into the groove 51 provided in the stem while the coil at its outer end is anchored as by engagement in a recess 52 between the driving wing 20 and the adjacent wall of the piston structure.

The valve 46 has a circumferentially extending channel or port 53 of varying depth and exposed to the end of the passage 54 leading through the piston structure to the high pressure working chamber 26. At its inner side the valve port is exposed to the space 21 and this space communicates with the working chamber 27 through a passage 55 in the piston structure. As the temperature of the hydraulic fluid changes, the thermostat coil will respond and will rotate the valve structure. With increasing temperature and resulting decrease in viscosity of the fluid the thermostat element will rotate the valve to expose a shallower portion of the valve port 53 to the passage 54, while, with decreasing temperature and resulting increase in viscosity, the thermostat element will rotate the valve to present a deeper portion of the valve port to the passage 54.

During the rebound movement of the shock absorber, that is when the vehicle body moves away from the axle, the retardation of the fluid flow from the high pressure working chamber 26 to the low pressure working chamber 27 is determined by the resistance to flow past the valve 40 and the valve 46. A resistance to compression movement of the vehicle spring should ordinarily be materially less than the resistance to rebound movement and I therefore provide a low pressure passageway through the shaft structure for flow from the low pressure to the high pressure chamber. This low pressure passageway 56 is best shown in Figures 2 and 4, the axis thereof being substantially coincident with the inner face of the bearing ring 13 so that the inner edge of this bearing ring may form the outer stop for the ball check valve 57 seated within the enlarged outer end of the passage for cooperation with the seat 58. During high pressure or rebound stroke of the shock absorber, the valve will be held against its seat to close the low resistance passageway so that only the fluid paths past the valves 40 and 46 are available. During the low pressure stroke the ball valve is unseated for opening the low resistance path 56 for flow of fluid from the low pressure to the high pressure chamber in addition to the flow past the valves 40 and 46, the size of the valve ball determining the reistance through the path 56.

The bearing flange 16 for the outer end of the shaft 15 has a bevelled end forming a pocket for packing material 59 engaged by a gland in the form of a sheet metal cup 60 whose inner end has the flange 61 forming a seat for the spring 62 engaged at its outer end by a retainer cup 63 suitably secured to the cover structure 17.

The cover structure is secured to the casing by the threaded ring 64 having the flange 65 abutting the inner side of the casing flange 11, the flange 11 at its outer side having a peripheral recess for a gasket 66. The inner corner of the flange 11 is well rounded so as to provide the annular recuperating channel 67 which at its upper end is connected by the passage 68 with the filler opening 28 so that any fluid escaping between the casing and the cover structure will find its way to the recuperating channel for return to the reservoir 25. The shaft, adjacent to the hub 18, has the circumferential intercepting channel 69 communicating at its upper end with a recess 70 in the cover structure leading to the reservoir so that escaping fluid will be intercepted and returned to the reservoir.

In order to eliminate building up of pressure behind the inner end of the shaft which might tend to force the shaft outwardly, a clearance space 71 between the shaft and the bottom of the casing is connected with the reservoir by way of a channel 72 cut in the outer face and edge of the bearing ring 13. A vent outlet 73 at the top of the reservoir is normally closed by a valve 74 by the pressure of the spring 75. Should the pressure in the reservoir be increased at any time above normal, as for example by accumulation of air, the vent valve will open to release the pressure.

The valve supporting plug 33 is shaped to conform accurately with the bottom of the recess 32 and is pressed into the recess so as to prevent high pressure fluid from penetrating into the joint area and loosening the plug. To assist in rigidly securing the plug, the shoulder thereon which supports the gasket 42 is so positioned as to be located a little distance below the outer surface of the cover 17 when the plug is pressed into bottoming engagement in the recess 32. The circumferential edge of the recess is then peened or swaged over the edge of the shoulder thus definitely holding the plug against loosening in the recess.

Figure 6 shows a modified arrangement in which the piston driving element, instead of being in the form of a wing or key integral with the shaft hub, is in the form of a Woodruff key 76 which engages in the key way 77 in the shaft stub 18 and extends downwardly into the recess 78 in the piston structure, the lower end of the key being cut away to provide the space 79 for receiving the thermostat element and the valve controlled thereby.

I have shown an efficient and practical embodiment of the various features of my invention, but I do not desire to be limited to the exact construction, arrangement and operation shown and described as changes and modifications may be made without departing from the scope of the invention.

I claim as follows:

1. In a hydraulic shock absorber, a housing for containing hydraulic fluid, a shaft journalled in said housing concentric therewith, a piston structure between said shaft and cylindrical housing wall and having a radially extending channel therein, a driving wing extending radially from said shaft into said piston channel, said driving wing being cut away to co-operate with said channel to provide a thermostat chamber, a rotary valve journalled in one side of said piston and having a stem extending transversely through said thermostat chamber and journalled in the other side of said piston, a thermostat coil in said chamber connected at one end to the piston structure and at its other end secured to said stem whereby response of said thermostat element to temperature change will cause rotation of said stem and valve, said valve having a metering port, and a fluid flow passageway through said piston from one side to the other thereof controlled by said valve port.

2. In a hydraulic shock absorber, a housing for hydraulic fluid, a shaft journalled in said housing concentric therewith, a piston extending between said shaft and the cylindrical wall of said housing and having a radially extending channel, a driving wing extending radially from said shaft and into said channel and being cut away to co-operate with said channel to provide a thermostat chamber, a cylindrical valve chamber in said piston at one side of said thermostat chamber with its axis at right angles to the plane of said wing, a rotary valve in said valve chamber, a thermostat coil in said chamber connected with said valve to cause rotation thereof in response to temperature change, a passageway through said piston from one side to the other thereof, and the metering port for said valve included in said passageway and operable to meter the flow therethrough as the valve is rotated by the thermostat.

3. In a hydraulic shock absorber, a housing for hydraulic fluid, a shaft journalled in said housing concentric therewith, a piston extending between said shaft and the cylindrical wall of the housing and having a radially extending channel, a driving wing extending radially from said shaft into said channel and being cut away to co-operate with said channel to provide a thermostat chamber, a cylindrical valve chamber in said piston at one side of said thermostat chamber, a valve in said valve chamber, a thermostat coil in said thermostat chamber connected with said valve to cause rotation thereof in accordance with change in temperature of the hydraulic fluid, a fluid passageway through said piston from one side thereof to the other, said valve having a metering port included in said passageway and said valve port being of varying cross section for exposure to said passageway to control the fluid flow therethrough to compensate for temperature variation as said valve is moved by said thermostat.

4. In a hydraulic shock absorber, a housing for hydraulic fluid, a shaft journalled in said housing concentric therewith, a piston extending between said shaft and the cylindrical wall of said housing and having a recess, a driving wing extending radially from said shaft into said recess, a thermostat coil within said recess with its axis at right angles to the radial plane of said wing, a passageway through said piston, and a valve operable by said thermostat coil to control the flow through said passage.

5. In a hydraulic shock absorber, a housing for hydraulic fluid, a shaft journalled in said housing, a piston secured to said shaft to rotate therewith and extending therefrom to the surrounding wall of said housing, said piston having a recess, a cylindrical valve chamber located in said piston at one side of said recess and with its axis at right angles to a radial plane of said shaft, a passageway through said piston from one side to the other thereof, a valve in said valve chamber for controlling said passage, and a thermostat in said recess connected with said valve to control the rotary setting thereof in accordance with change in temperature of the hydraulic fluid.

6. In a hydraulic shock absorber, a cup shaped casing having a peripheral exterior flange at its open end, a cover seating against said flange, a securing ring having a flange for engaging the casing flange and having threaded engagement with the cover whereby to secure the cover to the casing, means forming a fluid reservoir within the casing, a piston operable within the casing, an annular recuperating channel formed between the inner corner of the casing flange and said cover for receiving leakage fluid, a filler opening for said reservoir and a connection between said recuperating channel and said filler opening for the return of collected fluid to the reservoir.

7. In a hydraulic shock absorber, a housing for hydraulic fluid, a shaft journalled in said housing concentric therewith, a piston structure extending between said shaft and the cylindrical wall of said housing and having a recess, a thermostat coil entirely enclosed within said recess with its axis at right angles to the radial plane of said shaft, a passageway through said piston, and a rotary valve operable by said thermostat coil to control the flow through said passage.

8. In a hydraulic shock absorber, a housing for hydraulic fluid, a shaft journalled in said housing concentric therewith, a piston structure extending between said shaft and housing wall, said shaft having driving connection with said piston structure, said piston structure having a radially extending recess and a valve chamber intersecting said recess, a rotary valve structure in said valve chamber, and a thermostat coil enclosed within said recess concentric with said valve structure, said piston structure having a fluid passageway therethrough controlled by said valve structure.

9. In a hydraulic shock absorber, a cup shaped casing having a peripheral exterior flange at its open end, a cover seating against said flange, a securing ring having a flange for engaging the casing flange and having threaded engagement with the cover whereby to secure the cover to the casing, means forming a fluid reservoir within the casing, a piston operable within the casing, an annular recuperating channel formed between the inner corner of the casing flange and said cover for receiving leakage fluid, and a connection between said recuperating channel and said reservoir.

COURTNEY N. MITCHELL.